(12) United States Patent
Le Buhan et al.

(10) Patent No.: US 9,384,658 B2
(45) Date of Patent: Jul. 5, 2016

(54) SYSTEM AND METHOD TO ENFORCE UTILITY METER SECURITY

(75) Inventors: Corinne Le Buhan, Les Paccots (CH); Christophe Nicolas, Saint-Prex (CH); Joël Conus, Essertines-sur-Yverdon (CH)

(73) Assignee: Nagravision S.A., Cheseaux sur Lausanne (CH)

( * ) Notice: Subject to any disclaimer, the term of this patent is extended or adjusted under 35 U.S.C. 154(b) by 327 days.

(21) Appl. No.: 13/996,397

(22) PCT Filed: Dec. 7, 2011

(86) PCT No.: PCT/EP2011/072124
§ 371 (c)(1),
(2), (4) Date: Jul. 24, 2013

(87) PCT Pub. No.: WO2012/084523
PCT Pub. Date: Jun. 28, 2012

(65) Prior Publication Data
US 2013/0293390 A1    Nov. 7, 2013

Related U.S. Application Data

(60) Provisional application No. 61/425,812, filed on Dec. 22, 2010.

(30) Foreign Application Priority Data

Apr. 18, 2011   (EP) ...................................... 11162893

(51) Int. Cl.
*G08C 19/00* (2006.01)
*G01D 4/00* (2006.01)

(52) U.S. Cl.
CPC ................ *G08C 19/00* (2013.01); *G01D 4/004* (2013.01); *Y02B 90/242* (2013.01); *Y02B 90/244* (2013.01);

(Continued)

(58) Field of Classification Search
CPC ...... G08C 19/00; Y04S 20/327; Y04S 20/322; Y04S 20/42; Y04S 20/36; Y02B 90/244; Y02B 90/246; Y02B 90/242; G01D 4/004; G01D 4/002; G01D 4/006; G01D 4/008; G06Q 10/20; G06Q 50/60; G01R 21/001; G01R 21/005; G01R 21/006; G01R 21/07; G01R 21/06; G01R 21/10; G01R 21/1271; G01R 21/1273; G01R 21/1276
See application file for complete search history.

(56) References Cited

U.S. PATENT DOCUMENTS

| 5,200,646 A * | 4/1993 | Wand et al. ................... 307/116 |
| 2005/0012639 A1 | 1/2005 | Smit |

(Continued)

FOREIGN PATENT DOCUMENTS

| FR | 2936907 A1 | 4/2010 |
| WO | WO-0237227 A2 | 5/2002 |

(Continued)

OTHER PUBLICATIONS

"OpenWay: Smart Metering for the Smart Grid"; Itron Inc.; Sep. 1, 2009, XP55027607.

(Continued)

*Primary Examiner* — An T Nguyen
(74) *Attorney, Agent, or Firm* — Harness, Dickey & Pierce, P.L.C.

(57) ABSTRACT

The present invention relates to a system, and method for enforcing utility usage and metering functions by a utility meter associated with a utility consumer end user, connected to a remote utility management center by a communication network. The present invention proposes a utility meter for controlling and metering a least one utility consumption.

15 Claims, 3 Drawing Sheets

(52) U.S. Cl.
    CPC .............. *Y02B 90/246* (2013.01); *Y04S 20/322* (2013.01); *Y04S 20/327* (2013.01); *Y04S 20/36* (2013.01); *Y04S 20/42* (2013.01)

(56) References Cited

U.S. PATENT DOCUMENTS

2010/0192001 A1* 7/2010 Cornwall et al. ............. 713/400
2012/0026007 A1* 2/2012 Beattie ..................... 340/870.02
2012/0159641 A1* 6/2012 Rossi et al. ..................... 726/27

FOREIGN PATENT DOCUMENTS

WO    WO-03023415  A1    3/2003
WO    WO-2004034069 A1    4/2004
WO    WO-2011025397 A2    3/2011

OTHER PUBLICATIONS

Johnson, S. "OpenWay Demand Response: Maximizing Value and Efficiency in Energy Delivery"; Itron Inc.; Mar. 1, 2010, XP55027203.

Gering, K. et al. "OpenWay by Itron Security Overview"; Itron Inc.; Jan. 1, 2009; XP55027082.

International Search Report PCT/ISA/210 for PCT/EP2011/072124 dated Jun. 5, 2012.

* cited by examiner

SYSTEM AND METHOD TO ENFORCE UTILITY METER SECURITY

This application is the national phase under 35 U.S.C. §371 of PCT International Application No. PCT/EP2011/072124 which has an International filing date of Dec. 7, 2011, which claims priority to European patent application number 11162893.9 filed Apr. 18, 2011, and to U.S. provisional patent application No. 61/425,812 filed Dec. 22, 2010.

INTRODUCTION

This invention concerns the field of securing utility usage and reporting by utility meters against various hacking threats by means of security enforcement messages.

BACKGROUND

The on-going deregulation in worldwide energy distribution markets is driving the need for smart utility distribution grids and smart meters, enabling both utility providers and consumers to monitor the detailed consumption of an end user at any time through open communication networks. The energy market is particularly concerned as of today but related issues are also relevant to other utility markets such as water or gas. Thus, although the following description will refer mainly to utility meter for measuring electric power consumption, the subject-matter of the invention does not limit to such meters but also relates to utility meters for controlling and measuring other kinds of utility consumptions, such as gas or water.

While a number of legacy meters already implement some point-to-point automated reading protocols using for instance standard optical or modem interfaces, they are not able to interact with either the end user home area network devices or the remote utility monitoring facilities using wireless or power line communication networks. The industry answer to this regulatory requirement in the next decade will therefore consist in swapping the legacy meters for so-called smart meters.

Smart meters enable utility providers to monitor the detailed consumption of an end user at any time through open communication networks and a number of them are now required to implement a remote disconnect feature, so that the utility can remotely stop the service distribution for instance in the case of non-payment.

The document WO2004/034069 discloses a system for controlling utility meters in which consumer electrical installations are each connected to a point of delivery meter (optionally associated with a prepayment controller) located inside the house of the consumer. Point of delivery meters are each provided with a data retention unit. Each data retention unit is operatively associated with short-range communication means for communicating its data to an external communication station. The latter is a mobile station which can be easily carried by an inspector when he has to go to the consumer's house for inspecting the supply installation and, for instance, determining whether or not there are irregularities. This mobile communication station has wireless communication means for communicating with a central processing station for exchanging data of a particular point of delivery meter (and/or prepayment controller) that is under examination by the inspector. Owing to this system the inspected has access to data from the utility meter (via the data retention unit) without having to go inside the consumer's house.

The document WO2011/025397 discloses an automatic remote-metering apparatus and system comprising a utility meter provided with input/output unit that sends and receives data signal to and from a control unit connected to a remote central metering station by a communication unit. The utility meter is also provided with sets of tampering sensors to deter and protect the meter from malicious activities/tampering.

The document WO02/37227 discloses a utility system comprising a distribution network for distributing resource to a customer, a meter for metering the resource and for connecting and disconnecting a supply of the resource distributed to the customer, a control center for controlling distribution of the resource and two communication systems for sending information either from the meter to the control center or from the latter to the meter. The information includes signals for disconnecting or connecting the supply of the resource distributed to the consumer.

Clearly, the resulting dependency of the basic metering functionality on remote communication messages raises significant concerns on the effective robustness to software bugs as well as emerging threats such as smart grid worms and viruses taking advantage of smart meter security design flaws that may not be known at the time of deployment, but may become critical later. This is particularly evident in the case of the remote disconnect feature, as a major disruption target for cyber-terrorism but also a possible entry point for local thieves as a way to disconnect some house alarms from their power source.

In practice, today's security designs for smart grids and smart meters are largely inspired by the telecommunication industry and a large part of them is subject to emerging standardization by international committees such as ANSI or IEC. However the requirements are very different, as telecommunication end devices such as mobile phones, set-top-boxes or even television receivers seldom exceed an operational lifetime of 10 to 20 years. In contrast, metering equipment is typically installed at the time of a house building and meant to last at least 20 years, if not 50 to 100 years.

Once the standard security specifications are defined, it is no longer possible to update their design (for instance, cryptographic algorithms, key lengths and key management systems) without breaking compliance, which is a major issue in deregulated markets where any metering device model from any manufacturer needs to operate with any utility provider infrastructure and this possibly for the next 50 to 100 years.

There is therefore a need for alternative solutions designed from the beginning to enable life-long security monitoring, maintenance and renewability. In this approach, special attention needs to be given to the design of security system messaging.

Moreover, in order to strengthen or renew their security by "over the air" updates, smart meters standards define ways to change security credentials as well as to update the firmware at the meter level, possibly for security purposes, through remote communications.

As described in the "OpenWay by Itron Security Overview" White Paper from Itron, for practical, operational reasons, some of the corresponding messages may be broadcast or multicast into the utility grid network without a secure receipt acknowledgement from each target meter, typically because of the overhead in managing the corresponding upstream messages in a large scale metering deployment (for instance 10 million meters). In such a communication infrastructure, a simple way for the end user to avoid remote disconnect, security credential updates or security firmware updates therefore consists in spying and filtering out the corresponding downstream command messages from the utility before they reach the smart meter, in a such a one-way (stateless) communication model.

Even the system operates in full (stateful) or partial (semi-stateful) 2-way communication model, a hacker will try to hack the smart meter private keys, especially those corresponding to global secrets, by various types of local attacks in order to steal the private keys and use them to generate artificial acknowledge upstream messages back to the utility, in a two-way communication models. Depending on the quality of the meter security implementation design, some of those attacks may require physical damage to the meter hardware and can therefore be detected afterwards, for instance in a meter integrity control visit by the utility staff; but some brute-force attacks may be applicable without opening the meter, and thus being undetectable afterwards.

Ideally, no global system security keys would be stored in the meter at any time, so as to prevent that hacking a single meter implementation to steal its secret keys results in a global system failure. An example of such a global failure is well known by those skilled in the art from the DVD-CSS security design failure in the field of video content protection. As illustrated from the above quoted Itron white paper, it is known however that current state of the art meter implementations rely upon a global secret key to initiate the security communication key handling protocols.

There is therefore a need for a better communication system and method design to enforce those security updates without relying on the combination of stateful two-way communications with a perfectly trusted security implementation at the meter side.

SUMMARY OF THE INVENTION

The present invention relates to a system, and method for enforcing utility usage and metering functions by a utility meter associated with a utility consumer end user, connected to a remote utility management center by a communication network, wherein the enabling of the functionality of said utility meter as expected by the utility consumer end user is conditioned by the processing by said utility meter of security enforcement messages from the remote utility management center.

The primary functionality to be enabled as expected to the end user is simply access to the utility service—"utility activation". The proposed solution consists in binding this essential meter functionality to the reception of messages, instead of having the meter connected to the utility by default and switching the functionality off ("remote disconnect") or downgrading it by dedicated messages from the remote utility management center. The state of the art remote disconnect feature is thus changed into a remote connect feature, to ensure that remote disconnect messages cannot simply be filtered out by a malicious user.

Another functionality to be enforced as expected to the end user is access to most advantageous tariffs for utility usage. With the proposed system and method, in order to authorize an end user to benefit from the best tariffs, the end user meter must be up-to-date in terms of security upgrades such as firmware or key upgrades.

In a preferred embodiment, a remote connect activation message is sent at regular intervals by the utility management center to the utility meter to maintain the meter functionality. If the remote connect activation message is not received by the meter, the meter disconnects the power switch on its own. This message can be signed with the utility private key using asymmetric cryptography, so that it is impossible to simulate it without access to the utility protected secrets.

To this aim, the subject-matter of the present invention relates to a utility meter for controlling and metering a least one utility consumption comprising:
- at least one metering device provided with at least a first main counter for counting the utility consumption,
- a transmission unit for receiving messages from a remote management center and for sending at least one report message to the remote management center,
- a memory for storing data,
- a switch for switching the operating of the utility meter from a normal operating mode to a disrupted operating mode,
- a validity counter for incrementing/decrementing a validity value,
- a processor for processing functions of said utility meter,
- a transmission control unit for verifying if an acknowledgment message has been received from the management center in response to the report message, in the positive event the transmission control unit delivers a positive signal, in the negative event the transmission control unit delivers a negative signal,
- a validity unit for checking the validity of a renewal message received from the management center and reloading the validity counter in case where the renewal message is valid,
- an activating unit for maintaining the switch into the normal operating mode in accordance with the status of the signal delivered by the transmission control unit and the validity value of the validity counter.

Further, the switch can also be switched from the disrupted operating mode to the normal operating mode.

Depending on the embodiment of the invention, the disrupted operating mode of the utility meter can for instance stop the supplying of the utility consumption.

The utility meter could further comprise at least a second main counter which could be used, instead the first main counter, for temporarily counting the utility consumption. Such a second main counter may be in operation when the utility meter is switched into the disrupted operating mode, whereas the first main counter could therefore be used when the utility meter is switched in its normal operating mode. By using two main counters for counting the utility consumption, two different time slots (time periods) can be defined. Each time slots could be associated to a predetermined tariff. The disrupted operating mode could trigger the use of one of these main counters, such as the second main counter corresponding to the highest tariff, no matter what time the utility is used.

The present invention also relates to a method for enforcing utility usages and metering functions of a utility meter switchable between a normal operating mode and a disrupted operating mode. This utility meter being used for controlling and metering a least one utility consumption by means of at least one metering device provided with at least a first main counter for counting said utility consumption. This utility meter being further provided with a validity counter for incrementing/decrementing a validity value. This method comprising the steps of:
- sending a report message from the utility meter to a remote management center,
- verifying if an acknowledgement message has been received by the utility meter from the management center in response to the report message, in the positive event, delivering a positive signal, whereas in the negative event delivering a negative signal,
- checking, by the utility meter, the validity of a renewal message sent from the management center and reloading the validity counter with a new validity value in case where the renewal message is valid, maintaining the utility meter into its normal operating mode in accordance with the status of said signal and said validity counter.

According to a preferred embodiment, the step which performs checking of the validity of the renewal message is performed in accordance with a cryptographic process.

Other further embodiments of the present invention will be described in the following detailed description.

DETAILED DESCRIPTION

Figure 1:
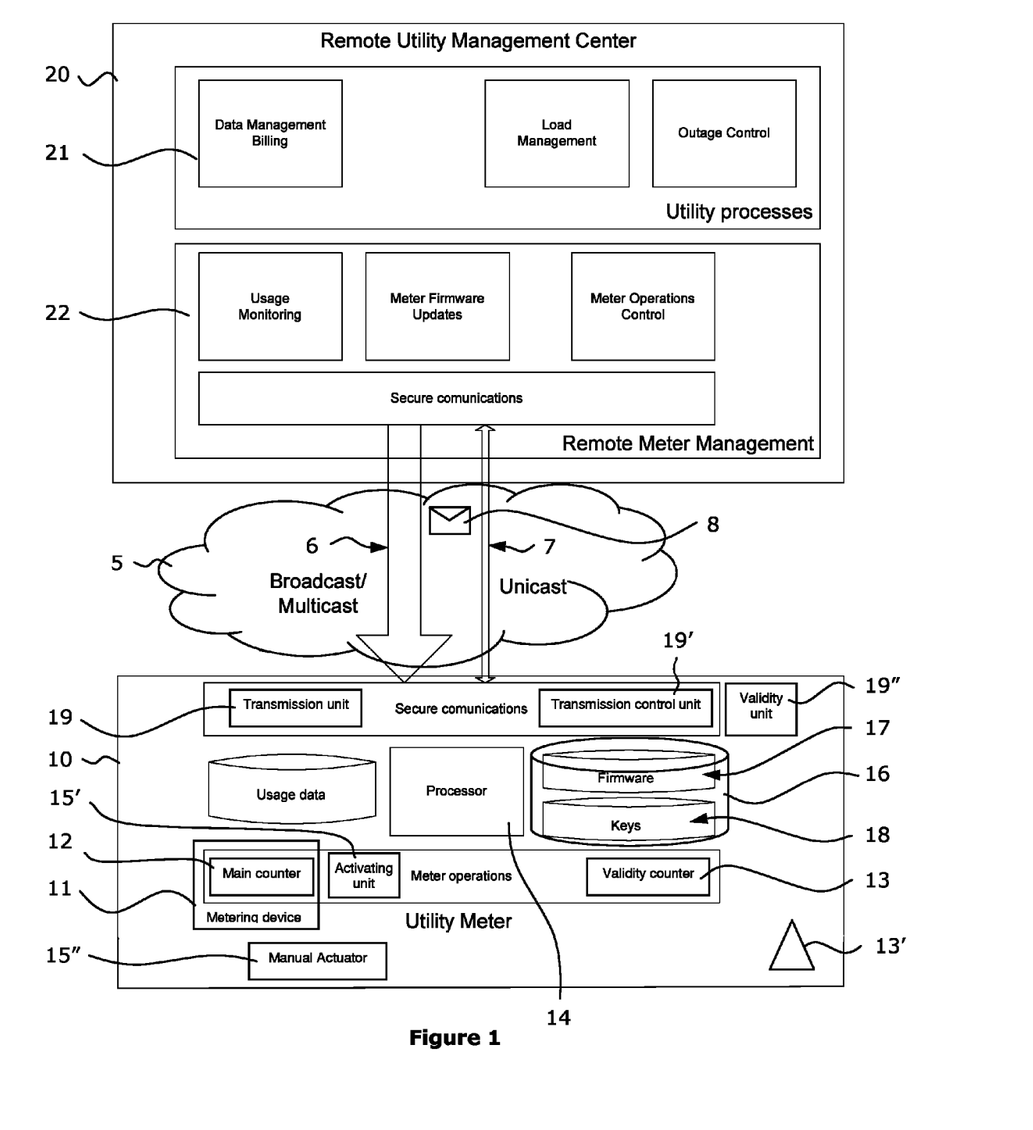
FIG. 1 shows a block diagram of a remote utility management center connected to a utility usage meter by a communication network supporting both unidirectional broadcast or multicast messaging and bidirectional unicast messaging.

In the proposed system, the utility management center 20 from FIG. 1 implements various utility management processes 21 such as data management billing, load management and outage control, in collaboration with the remote meter management system.

The remote meter management system 22 from FIG. 1 itself comprises functional components in charge with enforcing meter usage monitoring, meter firmware updates and meter operations control by means of secure communications 7, 9 with the individual utility meters 1 through the communication network 5.

The communication network 5 from FIG. 1 may be any utility metering communication physical network, such as, but not limited to, a cable network, the power line wire, or a wireless network, supporting any communication networking protocol, such as, but not limited to, Internet Protocol (IP) v4 or v6. The secure communications handlers from FIG. 1 both on the remote utility management center side and the individual utility meter side further need to comply with a common messaging specification. That specification may be private when the remote utility meter management system and the utility meters 10 are all provided by the same meter manufacturer. However, as the utility market deregulates, there is increasing need in standardizing this communication interface so that various utility vendors and various meter manufacturers can provide interoperable systems and equipment complying to common, standard specifications. Hybrid messaging protocols are another alternative where standard messaging driving the basic metering functionality is combined with advanced private messaging extensions. The private approach, either full or hybrid, is of particular relevance to ensure security monitoring, maintenance and renewability over time as any standard specifications, once published, have to be enforced as specified for the standard lifetime and therefore cannot provide any upgrade flexibility in case of a breach in the security specification without revisiting the standard itself. Examples of utility meter data networking standard specifications include the DLMS series IEC62056 in combination with the COSEM companion specifications or ANSI C12.22 in combination with the ANSI C12.19 industry standard for end device data tables.

Referring to FIG. 1, the utility meter 10 of the present invention comprises at least one metering device 11 which is provided with at least a first main counter 12 in order to measure a utility consumption by means of the measuring unit relating thereto, e.g. kWh for electrical power consumption or $m^3$ for gas or water consumption. The utility meter 10 also comprise a transmission unit 19 for receiving messages 8 from a remote manager center 20 and for sending at least one report message to this management center. It also comprises a validity counter 13 for incrementing or decrementing a validity value, a switch 15 for switching the operating (functioning) of the utility meter 10 from a normal operating mode (standard mode) to a disrupted operating mode. This utility meter comprises a memory 16 for storing any kind of data and a processor 14 which is in charge of managing all the functions of the utility meter. For instance, the processor 14 in charge with managing the security communications to the utility network 5 on the one hand and with managing the local meter operations on the other hand.

The utility meter of the present invention further comprises a transmission control unit 19' which is in charge of verifying if an acknowledgement message has been duly received from the remote management center 20 in response to the report message. In the positive event, the transmission control unit 19' delivers a positive signal, whereas in negative event it delivers a negative signal. The utility meter 10 also comprises a validity unit 19" (or any means to authenticate messages) for checking the validity of a renewal message sent by the remote management center 20 and received via the transmission unit 19. Once the renewal message is received by the utility meter, the validity unit 19" checks it in order to detect if this message is valid or not. In other words, this unit verifies at least if this message is a true message sent by the remote management center in order to detect any hacked messages and/or any messages sent by a hacker instead of the remote management center. Such verification can be carried out by using public and private keys for encrypting/decrypting messages and by using a certificate which is delivered by a third trusted authority for certifying the keys. Furthermore, in accordance with another embodiment, the validity unit 19" could also verify the integrity of the message, namely checking if the content of the renewal message has been modified by a intermediate hacker or not. This can be done by using an additional means, for instance a hash value used as a signature of the message.

In case where the validity unit concludes that the renewal message is valid, then the processor 14 (or the validity unit itself) can order reloading the validity counter 13 by resetting the latter with a new validity value.

Figure 2:
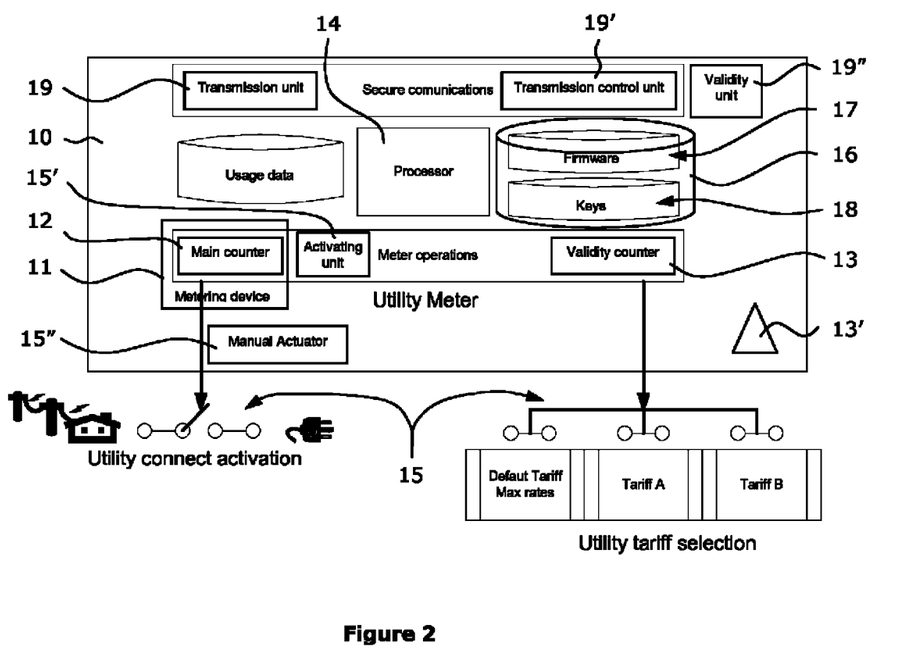
FIG. 2 illustrates the utility usage operations controlled by a utility meter.

As shown in FIG. 2, the utility meter 10 is provided with the switch 15 or any means to switch the operating of the utility meter between a standard or normal operating mode and a disrupted operating mode, depending on whether the validity value reaches a least one predetermined threshold value. The switch 15 can also be used for switching the functioning of the utility meter from the disrupted operating mode to the normal operating mode.

The utility meter 10 of the present invention also comprises an activating unit 15' for maintaining the switch 15 into the normal operating mode in accordance with the status of the signal delivered by the transmission control unit 19' and in accordance with the validity counter 13, i.e. the validity value of this validity counter. In other words, for checking the validity of the renewal message, the validity unit takes into account the aforementioned signal and/or the value of the validity counter. By extension, any Boolean operations (and, or, xor, nor, xnor, etc. . . . ) could be applied to this signal and this validity value. For instance, if the signal is not valid and/or the validity counter has reached a threshold value defined as being inadmissible, the activating unit 15' will no longer maintain the switch in its normal operating mode and the utility meter will be therefore switched into its disrupted mode. According to another embodiment, switching the switch 15 into the disrupted operating mode can be ordered whether the validity unit determines that a message is not valid or authentic, or if no renewal message has been received by the transmission unit before the value of the validity counter reaches a predetermined threshold value.

The signals delivered by the transmission control unit 19' can be sent either to the processor 14 or directly to the activating unit 15'.

Owing to the transmission control unit 19', the utility meter 10 of the present invention can check, for instance periodically, on the one hand whether the transmission unit 19 is efficient (i.e. the availability or readiness of the receiving unit to receive messages), and on the other hand whether a communication can be established with the remote management center 20. By sending a report message, the transmission control unit checks its sending unit and by receiving an acknowledgement message, this unit checks its receiving unit. According to one embodiment, the validity of the acknowledgment message can by also checked. According to a further embodiment, the renewal message is the acknowledgement message.

The meter operations, from the utility meter 10 plotted in FIG. 2, comprise at least the utility usage monitoring and reporting according to at least one default tariffs and possibly different possible tariff offerings, as well as the utility connect switch 15 activation control in markets where the remote disconnect feature is required by regulation or by utility vendors. According to one embodiment, the utility meter can comprise at least a second main counter which can be used, instead of the first main counter, for temporarily counting said utility consumption, e.g. in accordance with a tariff which is different from the tariff counted by the first main counter. To this end, the second main counter can be put in operation when the utility meter is switched into the disrupted operating mode.

The memory 16 of the utility meter can also be used to buffer the usage monitoring data and to store the meter firmware 17 and secure communication keys 18, in particular at least one personal key. The latter data is particularly sensitive to hacking and needs to be stored in a secure area such as secure non volatile memory 16.

In one preferred embodiment, security policies, security credentials as well as critical security components of the meter firmware 16 are designed to expire after an activation period. The utility meter processor 14 measures this grace period either out of proper time control, or after a certain number of events, by checking for instance whether a threshold for a counter tracking number of utility measurements is reached. To this end, the utility meter 10 comprises means to update the validity counter 13, namely to increment or decrement this validity counter 13, according to the utility consumption or a time.

The activation period duration or alternately the event counter definition and threshold value are themselves part of the security policies. A default security policy is defined in the firmware 17 programmed into the utility meter 10 at manufacturing time. Further security policy updates are configured from the utility management center 20 through the secure communications 6, 7 over the utility network 5 during the meter operation lifetime.

Figure 3:
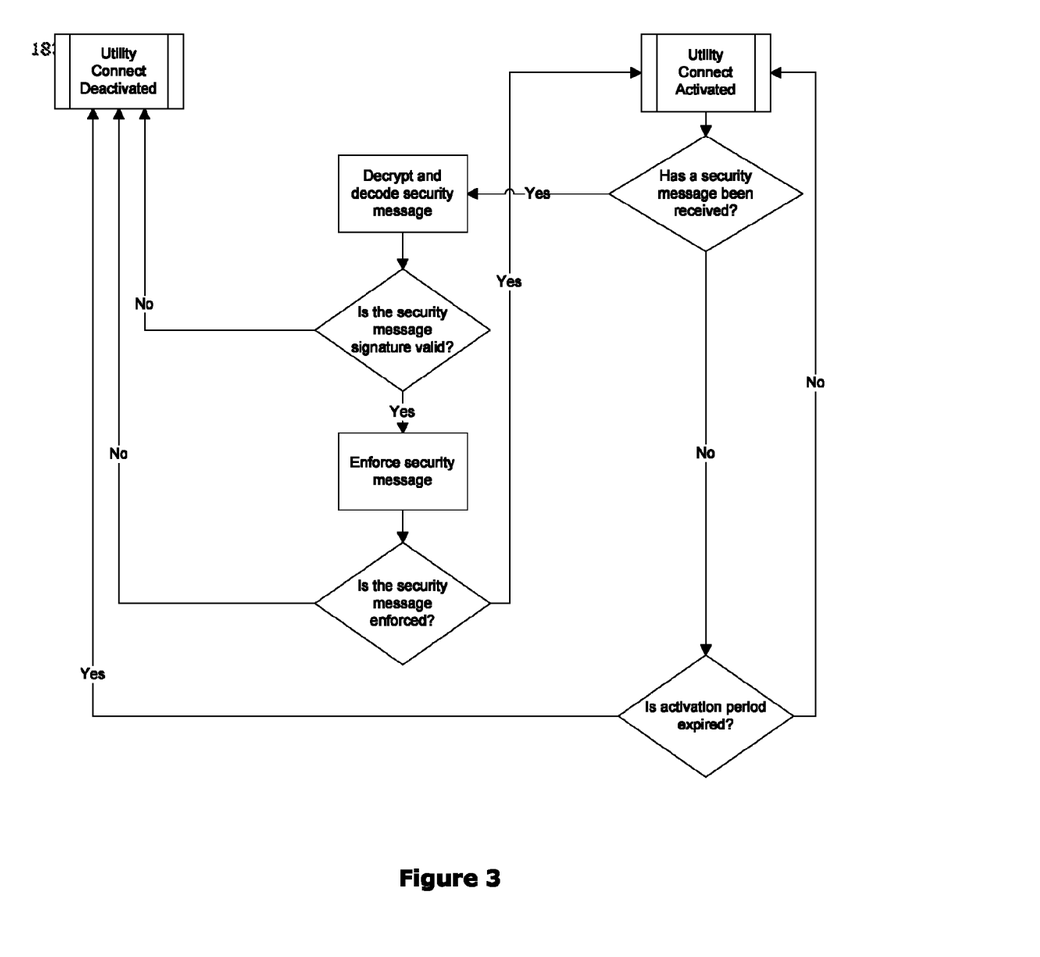
FIG. 3 depicts a flow chart of the proposed utility meter connect switch activation/deactivation control conditioned by the reception and enforcement of valid security messages.

Before activation period expiration occurs, a valid security message 8 is expected from the utility management center 20 as illustrated by FIGS. 1 and 3. This security message 8 is typically constituted of privately signed messages by the utility so that its validity can be cryptographically checked. In particular, such a security message cannot be generated from a simple meter key hack, so the only way to bypass it is to replace the overall firmware implementation into the meter, including its secure boot mechanisms, which is an additional barrier to a simple key spying as applicable in the state of the art meter security designs.

In most cases, the security message consists of a simple "proceed with current security" acknowledge message. Alternately, when a security policy, credentials, a new meter firmware 17 or a security keys 18 upgrade download is required from the utility management center 20, the security message 8 transmits the corresponding command to the utility meter 10. Multiple security messages 8 may be needed in this case, all of which are checked for validity and enforced by the utility meter 10.

If the utility meter 10 does not receive the security message 8 during the activation period, if the security message 8 is not valid, or if the meter 10 cannot not execute it, the meter security policies, credentials and/or components can be considered as no longer valid and the meter processor 14 can stop or downgrade its metering operations functionality accordingly. FIG. 3 illustrates the corresponding flowchart in the case of the connect activation operation.

Preferably, the report messages, the acknowledgment messages and the renewal message are encrypted messages. Alternately, only some of these messages can be encrypted. The exchange of information or renewal message between the utility meter 10 and the remote management center 20 is preferably performed under an asymmetric key cryptography scheme. For instance, the messages sent from the utility meter 10 (e.g. report messages) are encrypted by the utility meter with the public key of the remote management center 20 and the messages sent by the remote management center (e.g. renewal messages, acknowledgement messages) are encrypted by the latter with the public key of the utility meter. These messages are decrypted by the private keys corresponding to the public keys, namely by the personal key of the management center for the messages received by this management center and by the personal key of the utility meter for the messages received by this meter. Each public key and corresponding private key form together a pair of keys 18 which are used to encrypt and to decrypt the messages 8.

In one embodiment, the disrupted operating mode of the utility meter interrupts the supplying of electric power, gas or water, so that the utility consumption is stopped. As the effect of this means is relatively rough, especially for individual or personal consumer, a manual actuator 15" (e.g. mechanical or sensorial means), or any means that can be activated by the user, may be provided to bypass the activating unit 15' to temporary switch the operating of the utility meter from the disrupted mode to the normal operating mode, more particularly to a temporary operating mode which would temporarily allow to restore the utility service. Thus, by activating the manual actuator 15", the utility meter can still supply the utility service (e.g. electric power), under certain conditions, even if the validity value of the validity counter 13 has reached or goes beyond the predetermined threshold value. For instance, such conditions may depend on the duration of use of the utility or may depend on the quantity of consumption of the utility since the temporary switching of the utility meter by means of the manual actuator.

Before switching from the normal operating mode to another mode, such as the disrupted mode, the utility meter 10 of the present invention may further comprise a user alerting unit 13' or any other means that can be triggered, e.g. by the processor 14 or by the validity counter 13, to alert the consumer that the validity counter 13 of his utility meter 10 has reached a critical level. Such an alerting unit 13' would be useful to warn the consumer from any inconvenience, for instance the interruption of the utility consumption or any increasing tariff. The warning to the user could be made for instance via a message displayed on a screen of the utility meter or via any other alerting means. The critical level could be defined by a critical value, for instance a predefined value. A light, a sound alarm or a warning message intended to the user can be used by the alerting unit 13'.

In another embodiment, the security upgrade messaging transmits dynamic security countermeasure commands and forces their execution by the utility meter processor 14. To this end, the upgrade messages carry meter processor commands in the form of native code for this processor. Those countermeasures are designed to address various types of hacks, such as but not limited to, modification of the meter firmware 17, or emulation of meter messaging.

The validity counter 10 of the utility meter could be a time counter (or a check pulses counter) incremented according to an internal clock, or a counter based on counting of the utility consumption (kWh for electrical power consumption or $m^3$ for gas or water consumption).

Further, the threshold value, which allows switching between the normal operating mode and the disrupted operating mode, can be included within the renewal message. It could be the same for the new validity value used to reload the validity counter 13 in case of successful validity or authentication of the renewal message. In another embodiment, these values could rather be pre-stored in the memory 16 of the utility meter. Besides, the renewal message could further comprise updating information about the utility meter.

Each of information messages sent by the transmission unit 19 (in particular by its sending unit) to the remote management center 20 comprises at least a utility value counted by the main counter 12. In order to identify the senders of messages received by a management center, each of these messages includes a unique identifier ID pertaining to a utility meter 10.

Information messages sent by the utility meter 10 can comprise any information about this utility meter, for instance its status, information about the version of its firmware 17, information relating to the utility consumption, e.g. in view to collect statistical data or for any other purposes.

Certain improvements to the proposed system and method designs include the specialization of the security implementation by implementing custom cryptography logic blocks in the utility meter. Those crypto logic blocks typically take the form of a dedicated silicon circuitry to be associated with the meter processor 14. The security messaging may then advantageously be processed directly in hardware, so that it is less prone to advanced meter hacking than the firmware execution by a conventional meter processor implementation.

Alternately, in advanced meter designs, the custom cryptographic block can take the form of a dedicated firmware module securely designed based on emerging software security technologies such as obfuscation and white box cryptography in order to more specifically resist to advanced meter hacking attacks.

The advantage of the proposed system and method in the overall end-to-end security enforcement will be better understood by comparing the resulting security with the state of the art approach where the remote disconnect switch operation control can be bypassed by spying the meter keys and manipulating the messaging beyond the meter communication interface, therefore without mechanical intervention on the meter apparatus itself. With the proposed system and method, it may still be possible for a malicious end user to hack the mechanical connect activation switch 15 into the meter apparatus 10, but this component is typically designed as a tamper robust mechanical feature into the meter, which is further sealed by the utility personnel at meter installation and subject to electricity safety care. Therefore hacking the system this way is clearly more difficult and invasive than a simple message and key spying and manipulation on state of the art utility communication network designs. Moreover it typically leaves tamper evidence in the advent of the utility personnel maintenance or control visit, thus allowing for a posteriori forensic detection and legal action.

In another embodiment, in particular to address the meters where multiple utility rates are applied, the utility usage billing is based on the highest available rate by default. These meters provide a user interface to inform the end user on the available rates or various utility offerings and optionally let her select one out of them. According to a variant of the proposed system and method, the utility meter 10 then needs to receive, interpret and execute commands sent on a regular basis in the form of "positive addressing" management messages 8 to offer this attractive functionality to the end user. Those commands typically mix rate or utility offering information setup and update for end user display (functional part of the message) with meter security setup and update for meter operation control (security part of the message). It is possible to bind the interpretation of the functional part of the message to the execution of the security part of the message by binding them cryptographically. For instance the functional part may be encrypted in such a way that a key needs do be derived from the security update part of the message to be able to decrypt the functional part.

The utility consumption controlled and metered by the utility meter 10 as described above, could be electric power, gas or water. Besides, it could be also possible to imagine that only one utility meter could be able to meter and control several utility consumptions, in particular electric power consumption and water or gas if needed.

In line with the development of distributed power generation, certain advanced utility meters also monitor local power generation and feeding back into the grid network, subject to money back from the utility vendor to the end user. Therefore, in another embodiment, the proposed system and method can also control the local power generation functionality, by authorizing feeding back and measurement of locally generated power to the utility network only if the utility meter is up-to-date in terms of security messaging and upgrade handling The present invention also refers to a method for enforcing utility usages and metering functions of a utility meter 10 switchable between a normal operating mode and a disrupted operating mode. As disclosed above, this utility meter 10 is used for controlling and metering a least one utility consumption by means of at least one metering device 11 provided with at least a first main counter 12 for counting said utility consumption. It is also provided with a validity counter 13 for incrementing/decrementing a validity value. According to the present invention, the method comprises the steps of:

sending a report message from the utility meter 10 to a remote management center 20, verifying if an acknowledgement message has been received by the utility meter 10 from the remote management center 20 in response to the report message, in the positive event, delivering a positive signal, whereas in the negative event delivering a negative signal, checking, by the utility meter 10, the validity of a renewal message sent from the remote management center 20 and reloading the validity counter 13 with a new validity value in case where the renewal message is valid, maintaining the utility meter 10 into the normal operating mode in accordance with the status of said signal and said validity counter 13 (more precisely the current validity value counted by this validity counter).

Advantageously, by sending a report message and by receiving an acknowledgement, the present method firstly check if the transmission between the utility meter 10 and the remote management center 20 is working properly. Preferably, such verification is made periodically according to regular time intervals. Alternately, checking this transmission can be performed on the basis of irregular time intervals, for instance upon specific criteria which are not dependent on the time.

According to one embodiment, checking the validity of the renewal message is performed in accordance with a cryptographic process. Preferably, all messages exchanged between the utility meter 10 and the remote management center 20 are encrypted under an asymmetric key cryptography scheme (i.e. by using private keys and public keys). Preferably, checking the validity of the messages also includes checking the integrity of the messages, for instance by using digital signatures (issued e.g. from a hash function), digital certificates and a public key of a trusted authority.

As disclosed relating to the utility meter of the present invention, maintaining the utility meter 10 into its normal operating mode is performed in accordance with the status of the signal delivered at the end of the verification step of the acknowledgement message on the one hand, and with the current validity value of the validity counter on the other hand. The signal and the validity value are the two main parameters which can be taking into account for maintaining the utility meter into its normal operating mode. All Boolean operations can be applied to these two parameters in order to decide to maintain the utility meter in its normal operating mode or to switch it into its disrupted mode.

According to one embodiment, the renewal message sent by the remote management center 20 is the acknowledgment message itself. In a further embodiment, the validity counter 13 is incremented or decremented on the basis of time intervals or utility consumption, i.e. depending on the value of one main counter 12. In one embodiment of the present method, the renewal message sent by the remote management center 20 may comprise the new validity value for resetting (reloading) the validity counter 13. Alternately, one or several validity value can be found by consulting the memory 16 of the utility meter. Preferably, the renewal messages also include other information such as updating data for upgrading the utility counter or its firmware 17, by providing either new functions or new data. According to another embodiment, the method further comprises a step for temporarily switching back the utility meter from its disrupted operating mode to its normal operating mode. The limited duration of this switching can be based on an internal clock and/or on the utility consumption counted by one of the main counter 12 or on the current validity value of the validity counter 13. In accordance with a preferred embodiment, the method further comprises a step for alerting the end user that owns the utility counter, when the validity counter reaches a predetermined critical value.

The invention claimed is:

1. A utility meter for controlling and metering at least one utility consumption, the utility meter comprising:

at least one metering device provided with at least a first main counter, the first main counter configured to count said utility consumption, a transmission unit configured to receive messages from a remote management center and to send at least one report message to the remote management center, a memory configured to store data, a switch configured to switch the utility meter between operating according to a normal operating mode and operating according to a disrupted operating mode, a validity counter configured to increment or decrement a validity value, a processor configured to implement processing functions of said utility meter, a transmission control unit configured to verify if an acknowledgment message has been received from the remote management center in response to the at least one report message, generate a signal which comprises positive information in response to a determination that the acknowledgement message has been received, and generate a signal which comprises negative information in response to a determination that the acknowledgement message has not been received, a validity unit configured to check a validity of a renewal message received from the remote management center and reload the validity counter in response to a determination that the renewal message is valid, and an activating unit configured to control the switch, to cause the utility meter to operate according to the normal operating mode or the disrupted operating model, based on the information comprised in the generated signal and the validity value of said validity counter.

2. The utility meter of claim 1, wherein said renewal message is the acknowledgement message.

3. The utility meter of claim 1, wherein said report message, said acknowledgment message and said renewal message are encrypted messages.

4. The utility meter of claim 1, wherein said report message is encrypted with a public key of the remote management center and said renewal message and acknowledgment message are encrypted with a public key of the utility meter, each of these messages requiring respectively a private key of the utility meter and a private key of the remote management center to decrypt them.

5. The utility meter of claim 1, wherein said validity counter is configured to increment or decrement the validity value according to an internal clock.

6. The utility meter of claim 1, wherein said validity counter is configured to increment or decrement the validity value according to the first main counter.

7. The utility meter of claim 1, wherein the validity counter is configured to be reloaded with a new validity value and said new validity value and/or a threshold value are/is included within said renewal message.

8. The utility meter of claim 7, wherein said new validity value and/or said threshold value are/is pre-stored in the memory.

9. The utility meter of claim 1, wherein said renewal message further comprises update information associated with upgrading the utility meter.

10. The utility meter of claim 1, further comprising a manual actuator, the manual actuator configured to enable a manual bypass of the activating unit to temporary switch the the utility meter from operating according to the disrupted operating mode to operating according to the normal operating mode.

11. The utility meter of claim 1, further comprising an alerting unit, the alerting unit configured to be triggered in response to the validity counter reaching a critical value.

12. The utility meter of claim 1, further comprising at least a second main counter, the second main counter configured to temporarily count said utility consumption, the utility meter configured to temporarily switch from counting said utility consumption via the first main counter to counting said utility consumption via the second main counter, in response to the utility meter being switched to operating according to the disrupted operating mode.

13. The utility meter of claim 1, wherein the utility comprises at least one of electric power, gas or water.

14. A method for enforcing utility usages and metering functions of a utility meter, the utility meter configured to control and meter at least one utility consumption, the utility meter operable to be switched between a normal operating mode and a disrupted operating mode, by the utility meter being provided with at least one metering device provided with at least a first main counter the first main counter configured to count said utility consumption, the utility meter being further provided with a validity counter configured to increment or decrement a validity value, the method comprising:

sending, by the utility meter, a report message to a remote management center, verifying, by the utility meter, whether an acknowledgement message has been received from the remote management center in response to the report message, generating, by the utility meter, a signal based on the verifying, wherein the signal comprises positive information if the acknowledgement message has been received, and the signal comprises negative information if the acknowledgement message has not been received, checking, by the utility meter, whether a renewal message sent from the remote management center is valid, reloading, by the utility meter, the validity counter with a new validity value in response to a determination that the renewal message is valid, and operating according to the normal operating mode or the disrupted operating mode, based on the information comprised in the generated signal and the validity value of said validity counter.

15. The method of claim 14, wherein checking the validity of the renewal message is performed in accordance with a cryptographic process.

* * * * *